Aug. 7, 1923.
J. HOMER
1,464,474
DENTAL ARTICULATOR OR RELATOR
Filed Oct. 1, 1921      2 Sheets-Sheet 1
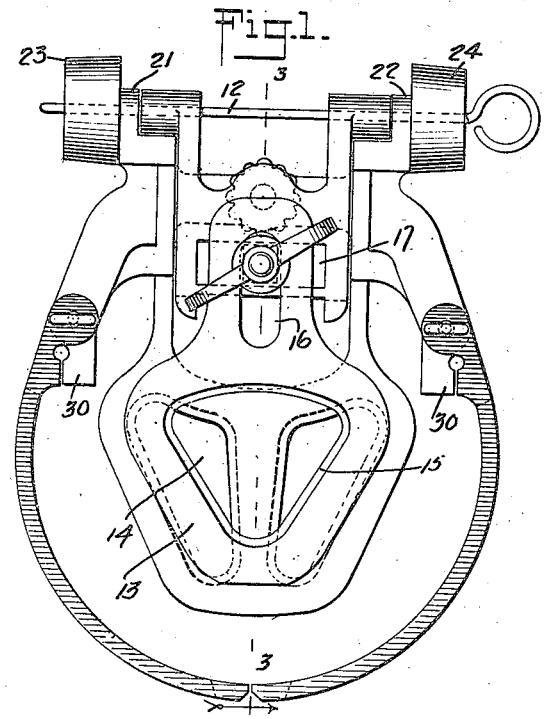
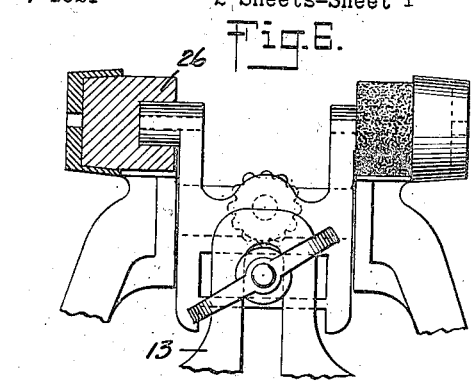
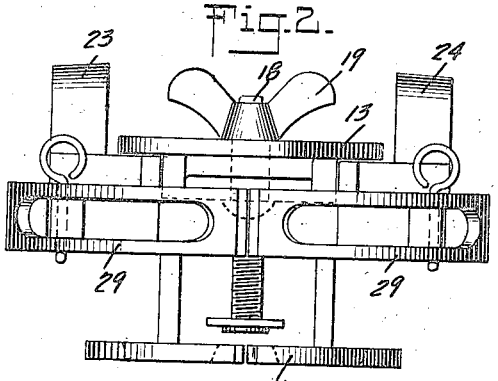
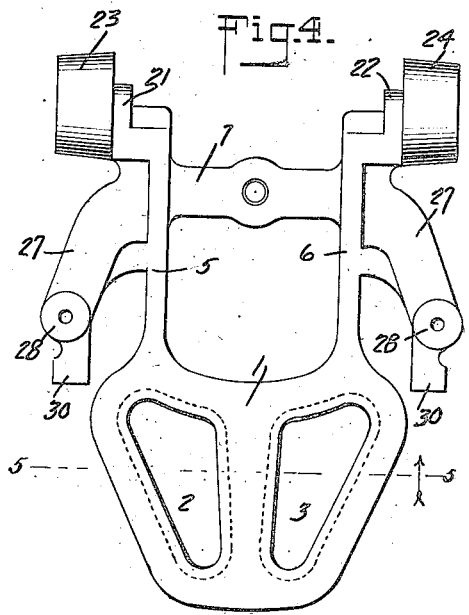
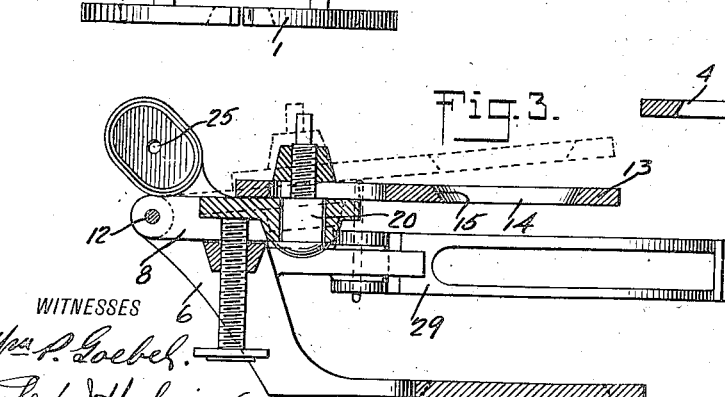
WITNESSES
INVENTOR
JOSEPH HOMER
BY
ATTORNEYS Aug. 7, 1923.
J. HOMER
DENTAL ARTICULATOR OR RELATOR
Filed Oct. 1, 1921
1,464,474
2 Sheets-Sheet 2
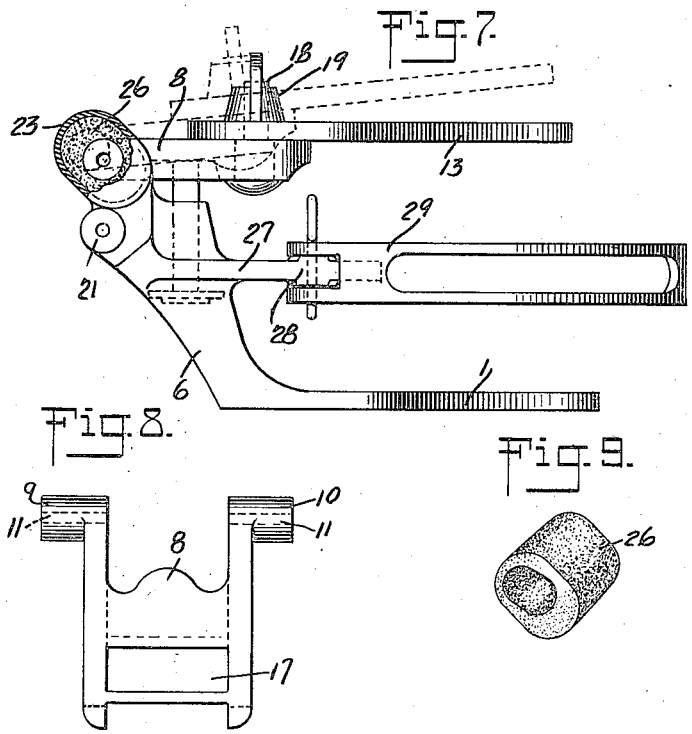
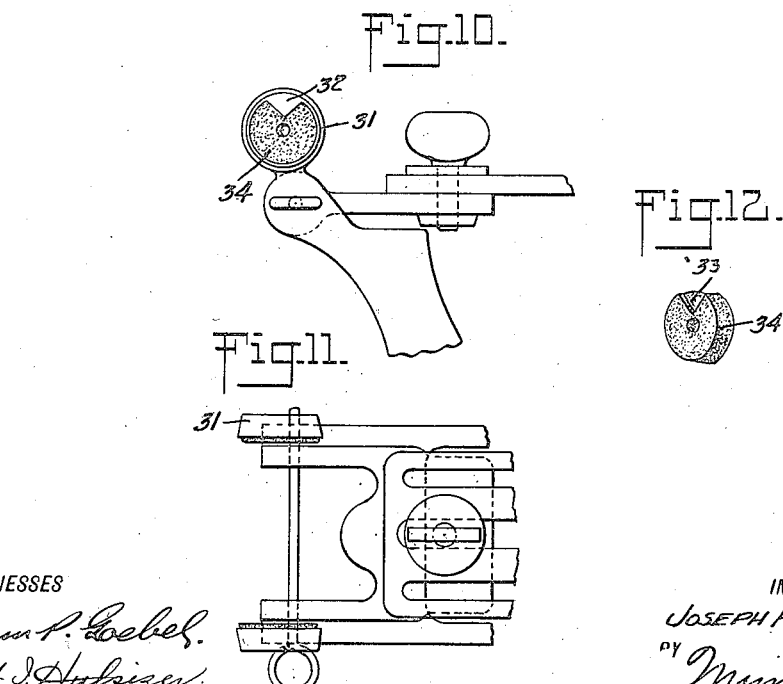
WITNESSES
William P. Goebel.
Robert J. Hubziger
INVENTOR
JOSEPH HOMER
BY
Munn & Co.
ATTORNEYS Patented Aug. 7, 1923.

1,464,474

UNITED STATES PATENT OFFICE.

JOSEPH HOMER, OF BOSTON, MASSACHUSETTS.

DENTAL ARTICULATOR OR RELATOR.

Application filed October 1, 1921. Serial No. 504,758.

*To all whom it may concern:*

Be it known that I, JOSEPH HOMER, a citizen of the United States, and a resident of Boston, in the county of Suffolk and State of Massachusetts, have invented a new and Improved Dental Articulator or Relator, of which the following is a full, clear, and exact description.

This invention relates to dental articulators and has for an object the provision of means in connection with an articulator whereby the movement of a jaw of the articulator can be caused to follow a predetermined curve or path approximating any desired movement of a set of teeth or natural jaw.

Another object resides in the provision of means whereby the movable jaw may be connected to the articulator frame in the usual manner or can be very readily changed to associate it with the means for giving it this predetermined movement.

A further object resides in the provision of means whereby the movable jaw can be adjusted to a much greater degree than hitherto.

A still further object resides in the provision of means whereby in making a given set of teeth the operator can form an impression of the movement of the teeth with respect to the other jaw which can be preserved in a permanent fixed form for future use and thereby enable other teeth to be made in a much simpler manner.

Another object resides in the provision of an articulator jaw which is shaped substantially similar to the standard shapes of models used thereon whereby the manipulation of the articulator is made easier.

A further object resides in the particular construction and arrangement of parts which are hereinafter described and claimed and shown in the accompanying drawings.

This invention is related to and constitutes an improvement on the articulator shown in my United States Patent No. 1,377,075, for dental articulator, patented May 3, 1921.

This invention is illustrated in the drawings, of which—

Figure 1 is a plan view of the articulator;

Figure 2 is a front elevation;

Figure 3 is a vertical section on the line 3—3 of Figure 1;

Figure 4 is a plan view of the lower or supporting portion of the articulator;

Figure 5 is a section on the line 5—5 of Fig. 4;

Figure 6 is a plan view of a part of the articulator showing particularly the auxiliary bearing portions in which an impression is formed;

Figure 7 is a side elevation of an articulator showing the upper jaw disposed in connection with the auxiliary bearing portion;

Figure 8 is a detail view of a portion of the jaw;

Figure 9 is a perspective view of one of the auxiliary bearing portions;

Figure 10 is a partial side view of a modified form of articulator;

Figure 11 is a partial plan view of the modification; and

Figure 12 is a perspective view of a modified bearing portion.

The drawings are illustrative of preferred forms of my invention, although it should be understood that various changes in the form and construction of the parts and the kind of materials used may be made and still retain the device within the scope of the invention as described and claimed.

The invention comprises an articulator having a lower stationary jaw portion 1 in which suitable apertures such as 2 and 3 are disposed. These apertures are provided with sloping side walls, such as 4, which adapt any impression or other mass of material disposed on the jaw to be retained thereon more firmly. The rear end of this plate or jaw 1 is provided with substantially vertically extending leg portions 5 and 6. A crossbar 7 extends between the leg portions 5 and 6 to form a strong, rigid structure. To the upper end of the leg portions a plate member 8 is pivoted. This plate member is shown in Fig. 8. The plate member 8 is provided at one end with outwardly extending lug portions, such as 9 and 10, through which apertures 11 extend for a purpose hereinafter to be set forth. A pin or shaft 12 is adapted to extend through these apertures to pivotally connect the plate 8 to the leg portions 5 and 6. This pivotal connection, as shown in Fig. 3, is the usual connection for articulators and permits a regular straight line movement of the upper jaw with respect to the lower jaw. This upper jaw is in the form of a second plate 13 provided with an aperture, such as 14, having sloping walls 15 for the purpose above mentioned. The rear end of this plate 13 is provided with a slot 16 which extends longitudinally of the plate and in the normal position of the plate is disposed at right angles to a similar slot 17 in the plate 8, which extends transversely across the front portion of the plate 8. The rear end of the plate 13 is normally disposed over the front portion of the plate 8; a threaded bolt, such as 18, extends therethrough, and a winged nut 19 co-operates with the threaded bolt whereby the plate 13 and the plate 8 may be rigidly connected in any desired adjusted relative position. As shown in Fig. 3, the lower portion 20 of the bolt 18 may be square in passing through the slot 17 in plate 8 so as to prevent turning of the bolt.

In Fig. 1 the lug portions 9 and 10 of the plate 8 are pivotally connected by the pin 12 to pivot points 21 and 22 disposed along the upper portions of the legs 5 and 6. However, in Fig. 3 the extreme upper ends of the legs 5 and 6 are shown provided with auxiliary bearing casings or chambers 23 and 24 the walls of which are slightly tapered and which are provided with apertures, such as 25, to receive a pin such as the pin 12. From an examination of Figs. 1, 4 and 6 it will also be observed that these casings are open at the inner sides thereof and that the edges of the open face of the casing are offset and out of line with the outer end of the lug portions 9 and 10. In Fig. 6 there is shown a mass of material, such as 26, disposed in the bearing casings 23 and 24 and into which the lug portions 9 and 10 are projecting. This material as shown forms an auxiliary bearing portion for the lugs 9 and 10, and in the achievement of one object of the invention it is made of some plastic material for a purpose hereinafter to be described.

In the operation of forming a set of teeth, it will be assumed that a definite model or set of teeth is mounted on the lower jaw, that a tooth or set of teeth has been in the process of manufacture, and that a model or other device is mounted on the upper jaw. It is the purpose of the invention to be able to provide means whereby the manipulation of the upper jaw may be controlled and caused to follow a definite path in accordance with well known movements of teeth in their daily functions. Consequently, assuming that the lug portions 9 and 10 are extending into the mass of plastic material such as 26, if the operator grasps the upper jaw in his hands and manipulates it in any predetermined manner, causing it to follow a definite line of movement, naturally the lug portions 10, being the pivot points of the jaw, will be permitted to follow a predetermined path by reason of the fact that the mass 26 forming the bearing portion for the lug portions is of plastic material, which will yield and permit this movement. The impression formed in the plastic material by the movement of the pivoted lugs 9 and 10 can if desired be preserved by any well known process in a hard set model, or the plastic impression can be laid away for future use, so that if in the future it is desired to cause the movement of a jaw in a similar manner it is merely necessary to insert the proper impressions in the auxiliary bearing casings 23 and 24 whereupon the manipulation of the jaw as previously conducted will cause the desired movement. However, the provision of apertures 25 permit a pin, such as 12, to be inserted within other impressions 26 to rigidly and pivotally connect the upper jaw with the casings 23 and 24 if desired for some purpose or other.

The leg members 5 and 6 are each provided with laterally extending wing portions 27 to the outer ends 28 of which laterally pivoted arms 29 are connected. These pivoted arms are adapted to receive any suitable device, such as an impression or mold of the lateral contours of the teeth, and can be moved to and from the upper and lower jaws for the purpose of determining and adjusting and shaping the teeth as they are being formed. Each of these wing members is provided with a projecting portion 30 which is disposed to lie in the path of part of the lateral arms 29 and limit the inward movement thereof. This will be apparent from a consideration of Fig. 1.

In Figs. 10, 11 and 12, I have shown a modified form of impression casing, such as 31, having therewithin a projection 32 corresponding in shape to a recess 33 in the plastic impression 34 adapted to be disposed within the casing 31. The registration of the recess 33 with the projection 32 will prevent the angular movement of the impression 34 within the casing 31. In other respects the operation of this modification is similar to the operation of the device above described.

It will, therefore, be observed that I have provided a mechanism in which the manipulation of a jaw of an articulator can be caused to produce an impression of a desired movement, which impression may be preserved in any well known manner so that this movement can be duplicated at any future time. This means for so producing the desired impression is an auxiliary means, readily applied to and associated with an ordinary articulator, and the use of which does not destroy all the other functions of the articulator established by common practice. Furthermore, the particular range of adjustment of the upper jaw permits a much wider range of use for this particular articulator than is possible with one in which the upper jaw is not so adjustable.

What I claim is:

1. A dental articulator which comprises a stationary jaw, supporting lugs connected thereto, bearing casings connected to said lug, a movable jaw having lugs to extend into the bearing casing, and a bearing member for each of said lugs, the bearing members disposed in said casings and formed of plastic material, whereby the lugs of the movable jaw can produce an impression in the plastic material of a predetermined movement of the movable jaw in response to the desire of the operator.

2. A connection for dental articulators between a stationary frame and a movable mold-supporting jaw associated therewith, which comprises a portion of plastic material to receive portions of the movable jaw, the plasticity of said material permitting said portions of the movable jaw to be moved in a predetermined manner whereby the movement of the jaws can simulate the movement of the human jaws.

3. A bearing member for dental articulators having a stationary and a movable jaw, which comprises a body of plastic material disposed between the stationary and movable jaws at the point of connection, said body of plastic material receiving portions of the movable jaw, the plasticity of the material permitting a movement of the connecting portion of the movable jaw whereby definite movements of said jaw are made possible.

4. A bearing member for dental articulators having stationary and movable members, which comprises a body of plastic material having a recess therein to receive a portion of the movable member.

JOSEPH HOMER.